United States Patent Office 2,820,693
Patented Jan. 21, 1958

2,820,693

PROCESS OF MAKING ALUMINA USING TIN, LEAD, OR GERMANIUM AS A CATALYST

George L. Hervert, Downers Grove, and Herman S. Bloch, Skokie, Ill., assignors to Universal Oil Products Company, Des Plaines, Ill., a corporation of Delaware No Drawing. Application October 24, 1955
Serial No. 542,465

14 Claims. (Cl. 23—143)

This invention relates to the production of alumina and more specifically to a method of preparing an alumina hydrosol by the interaction of water and metallic aluminum.

Alumina, either as the hydrate or as anhydrous aluminum oxide, is widely used in many phases of the chemical and petroleum industries. It has been employed in the petroleum industry as a catalyst for hydrocarbon conversion processes, as a support for catalytically active materials to be used in hydrocarbon conversion processes and as a dehydrating agent. It is widely used in other industries for the same purposes. The activated forms, which are considered to be merely various physical modifications of aluminum oxide, are especially known for their pronounced catalytic activity and adsorptive capacity. The use of alumina as a refractory is also well known. Alumina in the form of corundum has been found suitable for use in the manufacture of certain types of refractory and ceramic materials. In other uses alumina is mixed or composited with other compounds to produce a wide variety of substances with useful properties.

It is an object of our invention to provide a new process for the production of alumina.

The usual commercial method of producing alumina is by purifying ores in which the oxide is present. Another method is by the precipitation of aluminum hydroxide from its salts. The preparation of alumina as at present practiced entails the addition of a basic reagent to a solution of aluminum chloride hexahydrate. The resultant precipitate is washed and filtered to remove undesirable impurities.

When alumina is prepared from the commercially available aluminum chloride hexahydrate, the precipitated alumina requires extensive washing and filtering in order to remove the impurities including excess chloride. The present invention offers a novel method of preparing alumina which eliminates the need for washing and filtration and thereby reduces the time and expenses hereinbefore entailed in purifying the alumina.

We have now discovered and our invention broadly comprises an improved method of preparing alumina by reacting aluminum with water under specific conditions and in a specific manner. Hydrogen in a very pure state is produced as a by-product of this invention.

In one embodiment the present invention relates to a process for producing alumina which comprises commingling aluminum containing less than 100 parts per million (based on the aluminum) of a metal selected from the right-hand column of group IV of the periodic table consisting of germanium, tin and lead and an aqeuous solution of an acid which is reactable with aluminum to form hydrogen, reacting said solution and said aluminum until at least 25% of the hydrogen which is stoichiometrically equivalent to the amount of acid initially present is evolved, subsequently adding aluminum containing from about 100 to about 10,000 parts per million (based on the aluminum) of a metal selected from the right-hand column of group IV of the periodic table consisting of germanium, tin and lead, effecting further reaction and recovering alumina from the reaction mixture.

In another embodiment the present invention relates to a process for producing alumina sol which comprises commingling aluminum containing less than 100 parts per million of tin (based on the aluminum) and an aqueous solution of an inorganic acid which is reactable with aluminum to form hydrogen, reacting said solution and said aluminum until at least 25% of the hydrogen which is stoichiometrically equivalent to the amount of acid initially present is evolved, subsequently adding a promoter comprising mercury and aluminum charge containing from about 100 to about 10,000 parts per million of tin (based on the aluminum), effecting further reaction in the presence of said promoter and said aluminum, and recovering alumina from the reaction mixture, said acid being in amount of at least 0.13 equivalent of acid ion per equivalent of total aluminum.

In a specific embodiment the present invention relates to a method of producing an alumina sol which comprises commingling aluminum containing less than 100 parts per million of tin (based on the aluminum) and an aqueous solution of a mineral acid which is reactable with aluminum to form hydrogen, at a temperature of from about 30° F. to about 705° F., at a pressure sufficient to maintain at least a portion of the water in the liquid phase, reacting said solution and said aluminum until at least 25% of the hydrogen which is stoichiometrically equivalent to the amount of acid initially present is evolved, subsequently adding aluminum containing from about 100 to about 10,000 parts per million of tin (based on the aluminum) and a promoter comprising mercury in amount of from about 0.05% to about 50% by weight of the total aluminum, effecting further reaction in the presence of said promoter and said aluminum, and recovering alumina from the reaction mixture, said acid being in amount of at least 0.13 equivalent of acid anion per equivalent of total aluminum.

Our invention is based on the discovery that tin promotes the reaction between aluminum and water. While tin is the preferred metal to use as an activator or promoter, other metals in the right-hand column of group IV of the periodic table may be used; that is, germanium and/or lead may also be used in the process of the present invention. The metals germanium, tin and lead are characterized as being in the right-hand column of group IV of the periodic table according to Mendeleef's periodic arrangement of the elements. While tin is the most preferred metal of this group, since it generally produces the best results, it is to be understood that germanium and/or lead may also be used, but not necessarily with equivalent results. The following discussion will primarily be directed to the use of tin; however, again, it is to be understood that germanium and/or lead may also be used.

The tin may be incorporated in the aluminum in any suitable manner. A preferred method, however, is to add tin to molten aluminum. This method is preferred since the aluminum-tin mixture prepared by this method produces best results when used to prepare alumina. The tin may be added to the aluminum before or after the latter is molten. For example, tin dust particles may be contacted with solid aluminum and then the aluminum heated to above the melting point, or in another method the aluminum is already melted and the tin dust or tin filings are added to the melt. The mixture is a homogeneous mixture when this method of preparation is used; however, it is not definitely known how the aluminum and tin are associated in the mixture. There may be some strong physical or chemical bonds existing in the solid mixture or the tin and aluminum may be completely disassociated. Whatever the physical make-up, however, the presence of tin in the aluminum considerably speeds the aluminum-water reaction. Tin oxide or other tin compounds may be used instead of metallic tin since under the conditions used such materials are reduced by the molten aluminum to tin metal.

We have also found that the amount of tin used as a promoter appears to be rather critical especially in the lower limits. We have found that amounts below one hundred weight parts of tin per million weights of aluminum do not have a very great accelerating effect on the reaction between the aluminum and water. When at least one hundred weight parts of tin per million of aluminum, and preferably 150 weight parts per million are used the tin has a definite accelerating effect.

In accordance with our invention the aluminum is reacted with an acidic aqueous solution. The presence of an acid accelerates the reaction and further, acid anions are necessary in order to prepare an alumina sol.

The acidic aqueous solution may be achieved by the addition of mineral acids and/or organic acids. These acids are normally added in only small amounts when it is desired to make alumina gel, and in somewhat larger, but below stoichiometric amounts when a sol is being prepared. For example, to make an alumina sol in the presence of hydrochloric acid, an amount of acid above about 0.4 mol per mol of aluminum, and preferably above about 0.65 mol per mol of aluminum, may be used, as compared with the stoichiometric amount of three mols. To make a gel, amounts of acid one-tenth as large as those used for sol formation, or even less, may be used.

For purposes of alumina gel formation suitable mineral acids comprise the mono-basic acids, hydrogen fluoride, hydrogen chloride, hydrogen iodide, hydrogen bromide, nitric acid, etc.; the bi-valent acids, sulfuric acid, etc.; and the tri-valent acids, phosphoric acid, etc. Suitable organic acids are the poly-basic acids such as for example oxalic acid, malonic acid, succinic acid, maleic acid, phthalic acid, tartaric acid, citric acid, etc. These poly-basic acids result in the desirable gel formation whereas the lower, water soluble mono-basic fatty acids do not. For purposes of gel formation, the acid or mixture thereof must be selected in amounts so that the acid anion to aluminum ratio be, in terms of stoichiometric equivalents, as herein set forth. The mono-basic inorganic acids produce gels when the ratio of monovalent acid anion is in amounts below 0.13 equivalent of acid anion per equivalent of aluminum, and the bi-valent inorganic acid anion forms gels in amounts such that the ratio is below about 0.5. The poly-valent acid anions produce gels with a higher ratio of bi-valent acidic anion of below 1.0 equivalent of acid anion per equivalent of aluminum, and even higher; however, ratios below about 1.0 are preferred since ratios greater than 1.0 involve the use of excess free acid anion. For example, sulfuric acid forms gels with $SO_4^=/Al^{+++}$ ratios of below about 0.5 equivalent of acid anion per equivalent of aluminum while the corresponding maximum for $Cl^-/Al^{+++}$ is about 0.13. For gel formation, therefore, the acid is selected from the group consisting of inorganic acids, poly-basic or poly-valent organic acids and acid-acting salts in amounts such that the mono-valent acid anion is in amount below about 0.13 equivalent of acid anion per equivalent of aluminum, the bi-valent inorganic acid anion is in amount below about 0.50, the bivalent organic acid anion is in amount below about 1.0 and the amount of tri-valent acid anion is in amount below about 1.0. The bi-valent organic acid anions and higher valent organic and inorganic acid anions form gels above the 0.50 ratio of the di-basic inorganic acids with gels being formed using ratios as high as 5.0, however, ratios much above 1.0 are not preferred since ratios above 1.0 involve the use of excess free acid. Ratios below about 0.01 of any of the acid anions do not effectively catalyze the desired reaction.

For purposes of sol formation suitable inorganic or mineral acids comprise hydrogen chloride, hydrogen iodide, hydrogen bromide, nitric acid, sulfuric acid, etc., or mixtures thereof, the acid being such that its aluminum salt is water-soluble. The amount of acid or mixtures thereof must be such that the anion/aluminum ratio is in terms of equivalents at least 0.13 and generally within the range of from about 0.13 to about 0.75. The mono-basic acids produce sols even with the lower ratios within this range, while the bivalent acids require the higher ratios within this range. For example, sulfuric acid forms sols with $SO_4^=/Al^{+++}$ ratios of above about 0.5 equivalent per equivalent while the corresponding minimum for $Cl^-/Al^{+++}$ is about 0.13. The acids which form soluble aluminum salts are those having mono-valent or bivalent anions, and the limiting or lower ratio of anion to aluminum ratio for sol formation (in equivalents of acid anion per equivalent of aluminum) may be broadly given by the formula, $$R = (0.13)(4)^{n-1}$$

where $n$=the valence of the anion (1 or 2). For monovalent anions, $R=0.13$; for bi-valent, $R=0.52$ or about 0.5. Amounts below this range while possessing sufficient catalytic activity tend to produce alumina gels. The ratio of equivalents is determined with the total amount of aluminum, that is the aluminum having a tin concentration below 100 weight parts per million which is in the original reaction mixture plus the aluminum having a tin concentration of at least 100 weight parts per million which is added to the reaction mixture.

Using different concentrations of acids, therefore, produces alumina either as a gel, a sol or crystals of alumina. At temperatures above about 400° F. crystals of alumina are usually produced. The temperature range in which a fluid hydrogel or hydrosol is produced, therefore, is from about 30° F. to about 400° F. although alumina may be produced within the broader range of from about 30° F. to about 705° F.

Hydrogen is evolved from the aqueous solution of the acid when contacted with solid aluminum, and the hydrogen may be produced by the reaction of the acid with the aluminum as well as by reaction of the aluminum with water. When the aluminum contains at least one hundred parts per million of tin (based on the aluminum) we have found that the reaction proceeds at a vigorous rate which may become quite violent and therefore, the substances must be mixed slowly or periodically as the reaction proceeds. The rate of reaction depends upon the amount of acid and the amount of tin present in the aluminum. We have now discovered that when the acid is added to aluminum containing less than one hundred parts per million of tin (based on the aluminum), the reaction is much more easily controlled. Our invention, therefore, incorporates the steps of mixing the acid with aluminum containing less than one hundred parts per million of tin and after the reaction has proceeded for a time, and the reaction rate slows down because of diminished acidity, aluminum containing from 100 to about 10,000 parts per million of tin is added to the reaction mixture.

Hydrogen is evolved from the aqueous solution of the acid containing the solid aluminum of less than one hundred parts of tin per million, and, as hereinbefore mentioned, the hydrogen may be produced by the reaction of the acid with the aluminum and by the reaction of the aluminum with water. When the aluminum containing less than one hundred parts per million of tin and acidic aqueous solution are commingled, hydrogen is evolved and we have discovered that the benefits of the present invention, which are hereinbefore mentioned, may be most effectively utilized when the aluminum containing from 100 to about 10,000 parts per million of tin is added after about 25% and before 95% and preferably after 50% of the hydrogen which is stoichiometrically equivalent to the amount of acid initially present is evolved. For example, if one mol of sulfuric acid is present in the aqueous solution, 75% of the hydrogen which is stoichiometrically equivalent to the amount of acid is 0.75 mol of hydrogen; and, likewise if one mol of hydrochloric acid is present in the aqueous solution, 75% of the hydrogen which is stoichiometrically equivalent to this amount of acid is 0.375 mol of hydrogen. If aluminum containing at least one hundred parts per million of tin is added to the reaction solution before this amount of hydrogen is evolved the reaction often becomes violent and more difficult to control than when adding the high tin content aluminum after this amount of hydrogen is evolved.

It is also preferred to add a mercury promoter, that is a catalyst comprising mercury, to the reaction solution when at least 25% and preferably at least 50% of the hydrogen which is stoichiometrically equivalent to the amount of acid initially present is evolved by the reaction of aluminum containing less than one hundred parts of tin per million with the acidic solution. The mercury promoter and the aluminum containing at least one hundred parts of tin per million may be added simultaneously or may be added at different times; however, neither one should be added before at least 25%, and preferably at least 50% of the hydrogen is evolved or otherwise the reaction becomes violent and readily gets out of control. The mercury promoter also acts as an accelerant to speed the reaction of aluminum with water in order to form the desired alumina. The acid acts as an accelerant; however, acid anion is also necessary in order to prepare an alumina sol. We have found that the mercury compound reacts with the alumina and is reduced to metallic mercury which then appears to amalgamate with the aluminum. There is a difference in the catalytic effect of the various compounds of mercury and it seems likely that the distribution of the mercury amalgam centers which are probably cathodic is an important feature in determining the reaction velocity. However, we do not intend our invention to be limited by this theory. A comparison between the speed of the reaction when metallic mercury is used as a promoter and a proportional amount of a mercury compound shows a definite advantage for the mercury compound although metallic mercury is itself quite effective.

Since the mercury promoter acts as an accelerant or a catalyst, it is preferably used in very low concentrations. Any amount of a promoter used as an accelerant or catalyst herein mentioned will be a catalytic amount of mercury or referred to as a catalytic amount. As hereinbefore mentioned the amount of the mercury promoter will usually be within the range of from about 0.05% to about 50% by weight of the aluminum. Concentrations of mercury promoter below this range do not effectively catalyze the reaction, and concentrations above this range often produce undesirable results, for example, the aluminum surface may be so completely amalgamated as to reduce the anodic area sufficiently to decrease the reaction velocity.

The mercury promoter is selected from the following group and may be a mixture of two or more of these mercury promoters: mercury, mercuric acetate, mercurous acetate, mercuric bromate, mercurous bromate, mercuric bromide, mercurous bromide, mercuric bromide iodide, mercurous carbonate, mercuric chlorate, mercuric chloride, mercurous chloride, mercuric fluoride, mercurous fluoride, mercuric iodide, mercurous iodide, mercuric nitrate, mercurous nitrate, mercuric oxalate, mercuric oxide, mercurous oxide, mercuric sulfate, mercurous sulfate, etc., as well as mercury-nitrogen compounds such as ammono-basic mercuric bromide, ammono-basic mercuric chloride, etc. Almost any other mercury-containing compound may be used and as herein mentioned it may be a mercuric salt, a mercurous salt either organic or inorganic, an oxide of mercury, or a complex of mercury compounds.

Drying the alumina at various temperatures produces alumina in various modifications. Drying within the temperature range of from about 30° F. to about 400° F. produces mainly Gibbsite alumina. An analysis of the alumina dried at 400° F. shows that the product is chiefly Gibbsite, however, small amounts of Bohmite, a modification of hydrated alumina, are evidenced. As the temperature of the drying is increased, the percent of Bohmite in the product is accordingly increased and at a temperature of approximately 650° F. the product after the drying is analyzed as being almost entirely Bohmite.

The exact role of the tin also is not known. It appears that it is the free tin which is the promoter; however, the tin and aluminum may form a compound which is the actual promoter. Alternatively, the tin may by some means solubilize the surface coating of alumina that is formed by the reaction of aluminum with water causing the alumina to enter into solution and expose more aluminum surface. The tin activator may function to increase the electrochemical reaction by modifying the aluminum to a more easily dissociatable structure or by suppressing the amount of polarization. For example, the tin may cause some internal or intergranular stresses within the aluminum structure thereby rendering the aluminum more chemically reactive.

The tin is preferably used when mercury and/or a mercury compound is also used as a catalyst to accelerate the reaction between the aluminum and water. The tin in such a reaction, that is one in which the reaction is conducted in the presence of a mercury promoter, may have an effect upon the mercury, or the tin may aid in effecting the amalgamation of the aluminum with the mercury. We do not intend to be limited to any of these theories, however, since, as hereinbefore mentioned, the exact role of the tin is not completely known. However, its use greatly affects the speed of the reaction between aluminum and water or acids.

The degree of subdivision of the aluminum is another factor determining the rate of the reaction. The smaller the size of the particles, the greater the surface area of aluminum exposed to the water for reaction; a powdered aluminum, if not overly oxidized, is therefore excellent. Granulated or pelleted aluminum, or aluminum in ribbon form is also suitable; however, the larger the particle size of the aluminum metal charge, the longer the time required for complete reaction. In general, pellicles of not more than about an inch in greatest dimension are satisfactory, although those of less than about one-half inch average size are preferred. Aluminum pellets prepared by dropping molten aluminum into water have proven to be very satisfactory for producing alumina by the process of our invention.

The epsilon-alumina which forms rapidly on aluminum surfaces and acts as a coating which normally passivates aluminum does not effectively inhibit reaction under the conditions herein disclosed.

One embodiment of the present invention comprises agitating the reaction mixture sufficiently so that the reaction to produce alumina proceeds at a desirable rate. The reaction velocity is dependent upon the temperature of the reactants, the degree of subdivision of the aluminum, and to a limited extent the concentration or amount of tin and of mercury, and the degree of agitation given the mixture. Thus a reaction that proceeds slowly at a temperature of 212° F. with only a mild agitation or shaking of the mixture will proceed very rapidly if the mixture is vigorously agitated. At a temperature of 572° F., on the other hand, the reaction proceeds relatively rapidly even with a mild degree of external agitation. However, if the mixture is subjected to vigorous agitation, the time necessary for complete reaction is substantially decreased.

It is a desirable feature of the present invention that liquid water be present, and it is thus necessary when temperatures above the boiling point are employed to effect the reaction under sufficient pressure to maintain a liquid phase of water. The critical temperature of water is 705.2° F.; the definition of the critical temperature being that temperature above which a gas cannot be liquefied by pressure alone. It is desirable to use liquid water since it is much easier to have efficient mixing between the aluminum and water accomplished if there is a liquid phase.

The use of tin appears to have some effect on the properties of the alumina produced. For example, when tin is used in amounts of at least one hundred weight parts per million weight parts of aluminum, and the conditions of reaction are such that the alumina is formed as a slurry, the product slurry has a higher filtration rate than when tin is not present. Further, we have found that the resulting alumina powder is capable of being processed into pills of much greater strength than normally obtained with alumina prepared when the amount of tin is below one hundred weight parts per million.

The reaction of the aluminum with the acidic solution with and without the addition of the mercury promoter may be effected in any suitable type of equipment wherein the reactants are subjected to agitation and preferably to vigorous stirring. The operation may be carried out in continuous or batch-wise fashion. When temperatures above the normal boiling point of water are employed, and the reaction is performed with water in the liquid phase, it is of course necessary that the reaction vessel be capable of withstanding pressures sufficient to maintain a liquid phase of water. In small scale production of alumina by this process a rotating pressure autoclave is satisfactory. When the temperatures employed are at or below the boiling point of water, the reaction may be effected in ordinary open equipment in which a means is provided for vigorous stirring, agitation or circulation of the reactants. It is, however, necessary that the process equipment be constructed of such material that it is not affected by water or aluminum and/or the promoters used so that undesirable elements are not introduced into the desired alumina product; however, if the presence of these foreign substances is not objectionable, the above precautions need not be adhered to. Hydrogen is produced by the reaction of the aluminum with the solution and a means of venting must be provided if the pressure build-up caused by the production of this hydrogen is to be avoided. If the equipment will withstand this additional pressure, however, it is not necessary to vent the hydrogen continuously. The amount of hydrogen evolved may be measured by the pressure build-up on the system and/or the amount of hydrogen vented may be passed through a gas meter and the amount evolved measured in this manner.

The following examples are given to further illustrate the novelty and utility of the present invention but not with the intention of unduly limiting the same.

Example I

Eighteen grams of aluminum chips approximately $\frac{1}{16}''$ wide, $\frac{1}{4}''$ long, and $\frac{1}{16}''$ thick, having five weight parts per million of tin dissolved therein were utilized in this test. Distilled water (five hundred grams) and 0.4 gram of mercuric chloride were first placed in a two liter Pyrex flask equipped with a six-bladed Pyrex stirrer and heated. When the temperature reached 100° C. the aluminum chips were added. The hydrogen gas evolved was used to measure the amount of aluminum reacted and the rate of reaction. The stirrer was rotated at 1500 R. P. M. The maximum rate of reaction occurred near the beginning of the run and was 0.60 gram of aluminum reacted per hour per gram of unreacted aluminum. 14.3 hours were required to react 99.5% of the aluminum charge.

Example II

The experiment was repeated, this time using aluminum which had eight hundred parts per million of tin dissolved therein. The maximum velocity of reaction was 5.59 grams of aluminum per hour per gram of unreacted aluminum and in only 1.5 hours, 98.7% of the aluminum charge had reacted.

Examples I and II illustrate the accelerating effect of several hundred parts of tin per million in the reaction between aluminum and water to form alumina.

Example III

Aluminum chips of approximately $\frac{1}{16}''$ to $\frac{3}{32}''$ wide, $\frac{1}{4}''$ long and slightly more than $\frac{1}{16}''$ thick are used to prepare alumina. The aluminum contains 400 parts per million of tin. 235 grams of these aluminum chips are placed in a twenty liter creased Pyrex flask equipped with two reflux water condensers and a six-bladed Pyrex stirrer. The stirrer speed is controlled at 1500 R. P. M. 475 ml. of reagent grade hydrochloric acid and 1202 grams of distilled water are placed in the flask and brought up to approximately 212° F. before adding the aluminum. A temperature of approximately 212° F. is maintained in the flask by an electric heater. The hydrogen evolved by the reaction of the aluminum is passed through a wet test meter and measured. When the aluminum pellets are added the reaction is extremely vigorous and is difficult to keep under control.

The same run is repeated; however, in this case 85 grams of aluminum chips containing four parts per million of tin are first added to the reaction flask. The reaction proceeds much slower and is easily controlled.

475 ml. of reagent grade HCl with a sp. gr. of 1.1851 contains 207 grams of HCl or 0.0125 lb. mols of HCl. The stoichiometric equivalent of hydrogen of this amount of acid is $0.0125/2 \times 359$ or 2.245 cubic feet of hydrogen at standard conditions. 50 percent of this amount is 1.123 cubic feet. After approximately 1.5 cubic feet of hydrogen is evolved 1.0 gram of mercury and 150 grams of aluminum containing 330 weight parts per million of tin are added to the reaction mixture. The reaction velocity immediately accelerates, but can still be readily kept under control. Therefore, by adding the aluminum containing 300 weight parts per million of tin after about two-thirds of the hydrogen equivalent to the original acid is evolved, a continuous high reaction rate is maintained without the difficulties attendant on excessive reaction rates in the early stages, such as occur when both acid and a high tin content aluminum are initially present.

The reaction product is a clear water-white alumina sol which may be readily gelled and dried to a hard, highly absorptive alumina particularly well adapted to use as a catalyst support.

We claim as our invention:

1. A process for producing alumina which comprises commingling aluminum containing less than 100 parts per million (based on the aluminum) of a metal selected from the group consisting of tin, lead and germanium and an aqueous solution of an acid which is reactable with aluminum to form hydrogen, reacting said solution and said aluminum until at least 25% of the hydrogen which is stoichiometrically equivalent to the amount of acid initially present is evolved, subsequently adding aluminum containing from about 100 to about 10,000 parts per million (based on the aluminum) of a metal selected from the group consisting of tin, lead and germanium, effecting further reaction and recovering alumina from the reaction mixture.

2. The process of claim 1 further characterized in that said metal is germanium.

3. The process of claim 1 further characterized in that said metal is tin.

4. The process of claim 1 further characterized in that said metal is lead.

5. A process for producing alumina sol which comprises commingling aluminum containing less than 100 parts per million of tin (based on the aluminum) and an aqueous solution of an inorganic acid which is reactable with aluminum to form hydrogen, reacting said solution and said aluminum until at least 25% of the hydrogen which is stoichiometrically equivalent to the amount of acid initially present is evolved, subsequently adding a promoter comprising mercury and aluminum charge containing from about 100 to about 10,000 parts per million of tin (based on the aluminum), effecting further reaction in the presence of said promoter and said aluminum, and recovering alumina from the reaction mixture, said acid being in amount of at least 0.13 equivalent of acid ion per equivalent of total aluminum.

6. The process of claim 5 further characterized in that said acid is in amount of from about 0.13 to about 0.75 equivalent of acid anion per equivalent of total aluminum.

7. The process of claim 5 further characterized in that the reaction is effected at a temperature within the range of from about 30° to about 400° F.

8. A process of producing an alumina sol which comprises commingling aluminum containing less than 100 parts per million (based on the aluminum) of a metal selected from the group consisting of tin, lead and germanium and an aqueous solution of a mineral acid which is reactable with aluminum to form hydrogen, at a temperature of from about 30° F. to about 705° F., at a pressure sufficient to maintain at least a portion of the water in the liquid phase, reacting said solution and said aluminum until at least 25% of the hydrogen which is stoichiometrically equivalent to the amount of acid initially present is evolved, subsequently adding aluminum containing from about 100 to about 10,000 parts per million (based on the aluminum) of a metal selected from the group consisting of tin, lead and germanium and a promoter comprising mercury in amount of from about 0.05% to about 50% by weight of the total aluminum, effecting further reaction in the presence of said promoter and said aluminum, and recovering alumina from the reaction mixture, said acid being in amount of at least 0.13 equivalent of acid anion per equivalent of total aluminum.

9. The process of claim 8 further characterized in that said promoter is metallic mercury.

10. The process of claim 8 further characterized in that said promoter is a mercury salt.

11. The process of claim 8 further characterized in that said promoter is an oxide of mercury.

12. The process of claim 8 further characterized in that said metal is germanium.

13. The process of claim 8 further characterized in that said metal is tin.

14. The process of claim 8 further charactrized in that said metal is lead.

References Cited in the file of this patent

UNITED STATES PATENTS 2,746,842    Bloch et al.  ---------- May 22, 1956